(12) United States Patent
Filippi et al.

(10) Patent No.: US 7,941,921 B2
(45) Date of Patent: May 17, 2011

(54) METHOD FOR THE PRODUCTION OF A PLATE TYPE HEAT EXCHANGER AND RELATED HEAT EXCHANGER

(75) Inventors: Ermanno Filippi, Castagnola (CH); Enrico Rizzi, Casnate Con Bernate (IT); Mirco Tarozzo, Ligornetto (CH)

(73) Assignee: Methanol Casale S.A. (CH)

(*) Notice: Subject to any disclaimer, the term of this patent is extended or adjusted under 35 U.S.C. 154(b) by 270 days.

(21) Appl. No.: 12/091,520

(22) PCT Filed: Oct. 31, 2006

(86) PCT No.: PCT/EP2006/010444
§ 371 (c)(1),
(2), (4) Date: May 21, 2008

(87) PCT Pub. No.: WO2007/057103
PCT Pub. Date: May 24, 2007

(65) Prior Publication Data
US 2008/0314574 A1      Dec. 25, 2008

(30) Foreign Application Priority Data
Nov. 18, 2005   (EP) ..................................... 05025208

(51) Int. Cl.
*B21D 53/04* (2006.01)
*F28F 3/14* (2006.01)
*B01J 19/00* (2006.01)

(52) U.S. Cl. ............. 29/890.039; 29/890.03; 29/890.04; 29/890.044; 29/890.054; 165/157; 165/158; 165/168; 165/170; 165/175; 422/600; 422/198; 422/200

(58) Field of Classification Search .................. 422/188, 422/198, 148, 200; 165/158, 163, 168, 157, 165/166, 170, 175, 179; 29/890.03, 890.039, 29/890.04, 890.044, 890.054
See application file for complete search history.

(56) References Cited

U.S. PATENT DOCUMENTS
2,944,328 A * 7/1960 Adams ..................... 29/890.042
3,757,855 A * 9/1973 Kun et al. ..................... 165/166
(Continued)

FOREIGN PATENT DOCUMENTS
EP            1321733 A2     6/2003
(Continued)

*Primary Examiner* — Walter D Griffin
*Assistant Examiner* — Huy-Tram Nguyen
(74) *Attorney, Agent, or Firm* — Akerman Senterfitt

(57) ABSTRACT

A method for the production of heat exchangers (10, 110, 210) of the so-called plate type, comprising the operative steps of: —juxtaposing a couple of substantially identical metal plates (12, 14), —fixing together said juxtaposed plates (12, 14) to one another by means of welding performed at respective perimetric sides (13a, 13b, 13c, 13d), —further fixing together said juxtaposed plates to each other by means of a plurality of welding tracts (22), arranged in at least two alignments, parallel and adjacent to a couple of opposite perimetric sides (13a, 13c) of the plates themselves (12, 14), and at a pre-established spaced relationship from said sides, —introducing a fluid under pressure between said juxtaposed metal plates (12, 14), to form a hollow, substantially box-shaped body (17), in which an internal chamber (16) and two substantially tubular passages (16a, 16b), formed between said couple of opposite perimetric sides (13a, 13c) and the respective adjacent alignments of the welding tracts (22), are defined, said substantially tubular passages (16a, 16b) having an axis parallel to said opposite perimetric sides (13a, 13c) and being in fluid communication with said internal chamber (16), —cutting said hollow body (17) along said substantially tubular passages (16a, 16c) and in the direction of their axis, thus obtaining a hollow body (17) equipped, on opposite sides, with substantially semi-tubular passages (16c, 16d), open towards the outside of the body (17) itself, —associating with said substantially semi-tubular passages (16c, 16d), respective distributor duct (18) and collector duct (20).

10 Claims, 6 Drawing Sheets

U.S. PATENT DOCUMENTS

| | | | |
|---|---|---|---|
| 6,460,614 B1 * | 10/2002 | Hamert et al. | 165/170 |
| 7,121,002 B1 * | 10/2006 | Roth | 29/890.039 |
| 2005/0061490 A1 * | 3/2005 | Filippi et al. | 165/145 |
| 2005/0252645 A1 * | 11/2005 | Filippi et al. | 165/157 |

FOREIGN PATENT DOCUMENTS

| | | |
|---|---|---|
| GB | 1167090 A | 10/1969 |
| WO | 01/14080 A1 | 3/2001 |
| WO | 02/053276 A1 | 7/2002 |

* cited by examiner

METHOD FOR THE PRODUCTION OF A PLATE TYPE HEAT EXCHANGER AND RELATED HEAT EXCHANGER

FIELD OF APPLICATION

In its broadest aspect, the present invention relates to a method for the production of a so-called plate type heat exchanger, i.e. of a heat exchanger comprising a box-shaped flattened body, in which is defined an internal chamber, destined to be crossed by a heat exchange operative fluid.

Heat exchangers of the aforesaid type are advantageously used in heat exchange units of chemical reactors, to optimally complete exothermal or endothermic chemical reactions; such as for example, in the synthesis reactions of ammonia, methanol, formaldehyde or styrene respectively, said exchangers is necessary to remove or respectively supply heat to a reaction environment, generally a catalytic bed, in order to control the temperature thereof in a narrow range around a pre-calculated theoretical value.

In particular, the invention relates to a method for the production of heat exchangers of the said plate type, comprising the operative step of:
  juxtaposing a couple of substantially identical metal plates,
  fixing together said juxtaposed plates to one another by means of welding performed at respective perimetric sides,
  further fixing together said two juxtaposed plates to each other by means of a plurality of welding tracts, arranged in at least two alignments, parallel and adjacent to a couple of opposed perimetric sides of the plates themselves, and at a pre-established spaced relationship from said sides,
  introducing a fluid under pressure between said juxtaposed metal plates, to form a hollow, substantially box-shaped body, in which said internal chamber and two substantially tubular passages, formed between said couple of opposed perimetric sides and the respective adjacent alignment of welding tracts, are defined, said substantially tubular passages having an axis parallel to said opposed perimetric sides and being in fluid communication with said internal chamber.

It should be noted that in the present patent application the term "welding tracts" refers in general to welding areas of the juxtaposed metal plates, having a pre-established length, including the borderline situation wherein the welding area is punctiform (in this case the term "welding spot" is used).

The invention also relates to a heat exchanger obtained with said method, as well as a chemical reactor that comprises the aforesaid heat exchangers.

PRIOR ART

In many industrial applications, and in particular in the chemical reactor field, the use of heat exchangers of the so-called plate type, is well-known, said heat exchangers comprising a box-shaped, parallelepiped-shaped, flattened, generally rectangular body, inside which a chamber is defined, destined to be crossed by a heat exchange operative fluid.

It is also known that to produce said heat exchangers, it is provided the perimetric welding of a pre-selected couple of juxtaposed metal plates, and thereafter, between the metal plates thus fixed together, a fluid is introduced under appropriate pressure (pumping step) to mutually space out said plates and to obtain the internal chamber of the exchanger.

During the aforesaid pumping step of fluid under pressure, in order to maintain the parallelepiped form of said body, as well as to prevent the plates from being excessively spaced out and therefore excessively stressed in traction, with the risk of formation of cracks, fissures and even violent fracture, prior art provides further welding between the juxtaposed plates, realized at a plurality of pre-selected tracts thereof, preferably arranged according to a plurality of alignments, parallel to a couple of opposed perimetric sides of the plates in question.

During the pumping step, a chamber is formed between the metal plates (internal chamber of the heat exchanger), as stated previously, in which a plurality of "ducts" can be individualized, in the same number, plus one, as the aforesaid alignments of welding tracts, ducts which are all in mutual fluid communication through passages formed between one welding tract and the adjacent tract thereto. With pumping step the hollow, substantially box-shaped body of the desired plate type heat exchanger is realized.

Moreover, with an appropriate arrangement of the aforesaid welding tracts, as well as providing further possible welding tracts, for example parallel to the other couple of opposed perimetric sides, it is possible to define pre-established paths for the heat exchange operative fluid to cross the hollow body, for example in the form of a serpentine.

In said box-shaped body, the "ducts" formed and extended at the aforesaid couple of opposed perimetric sides of the metal plates, are conceived to act as distributor and respectively collector of the operative fluid destined to cross said plate type heat exchanger.

The distance between the various alignments of the welding tracts is chosen according to the mechanical characteristics of the juxtaposed metal plates, due to the fact that, during the pumping action, the portions of plates between two adjacent alignments must not excessively space out—deform in order to prevent the risk of creating the fissures. In other words, according to said mechanical characteristics, the distance between the alignments of welding tracts has a upper bound.

The cross section of said collector and distributor ducts is chosen according to the flow rate of operative fluid which is desired to be fed in the heat exchanger, and therefore, normally, it has a lower bound. Basically, the distance between the weldings of said opposed perimetric sides and the respective adjacent alignments of welding tracts has a lower bound.

The said two bounds do not coincide, meaning that the distance between the weldings that define the aforesaid distributor and collector ducts is always greater than the distance in relation to the adjacent alignments of the welding tracts, wherein the longer the heat exchangers (and therefore the larger the volume of the internal chamber to be fed with operative fluid), the greater such difference of distance.

Although it is advantageous from different points of view, the method for the production of plate type heat exchangers, according to the description supplied above, presents recognized drawbacks.

The main drawback concerns the pumping step of the fluid under pressure, where great care must be taken, and this has a considerable influence on heat exchanger production times.

In fact, since—as was stated previously—the distance between the welding of said opposed perimetric sides and the respective adjacent alignments of welding tracts is greater than the distance between two alignments of adjacent welding tracts, the fluid under pressure, meeting a lesser resistance to the deformation, begins to deform (swell) those portions of exchanger that will form the distributor and collector ducts of the exchanger.

In order to correctly "swell" also the remaining portions of exchanger, preventing a "explosion" of the distributor and collector ducts which are forming themselves, the swelling of these ducts must be restrained using appropriate external restraining elements or devices, such as for example specific metal plates, suitably positioned and pressed against the collector and distributor ducts themselves, all of which makes the production cycle notably complex.

Moreover, said "restraining" operative step is difficult to be completely automated, resulting in a incomplete exploiting of the productive potential of the machines and equipment currently available for performing said production method.

SUMMARY OF THE INVENTION

The technical problem underlying the present invention is to devise and provide a method for the production of a plate type heat exchanger, capable to overcome the limitations and/or drawbacks described concerning prior art in a simple, cost-effective and efficient manner, i.e. capable to considerably reduce the production times, at the same time, increasing the automation level of the equipment which carries out the process.

This problem is solved, according to the present invention, by a method for the production of plate-type heat exchangers, of the type described above and characterized in that it comprises the further operative steps of:

cutting said hollow body along said substantially tubular passages and in the direction of their axis, thus obtaining a hollow body equipped, on opposite sides, with substantially semi-tubular passages open towards the outside of the body itself, associating with said substantially semi-tubular passages respective distributor and collector ducts, destined to distribute and respectively collect a heat exchange operative fluid into and from said internal chamber.

Advantageously the aforesaid method unusually reduces the plate type heat exchanger production times.

Further characteristics and advantages of the method for the production of plate type heat exchangers according to the present invention will be made clear from the following description of a preferred embodiment thereof, given for indicating and not limiting purposes with reference to the attached drawings.

DETAILED DESCRIPTION OF A PREFERRED EMBODIMENT

Figure 1:
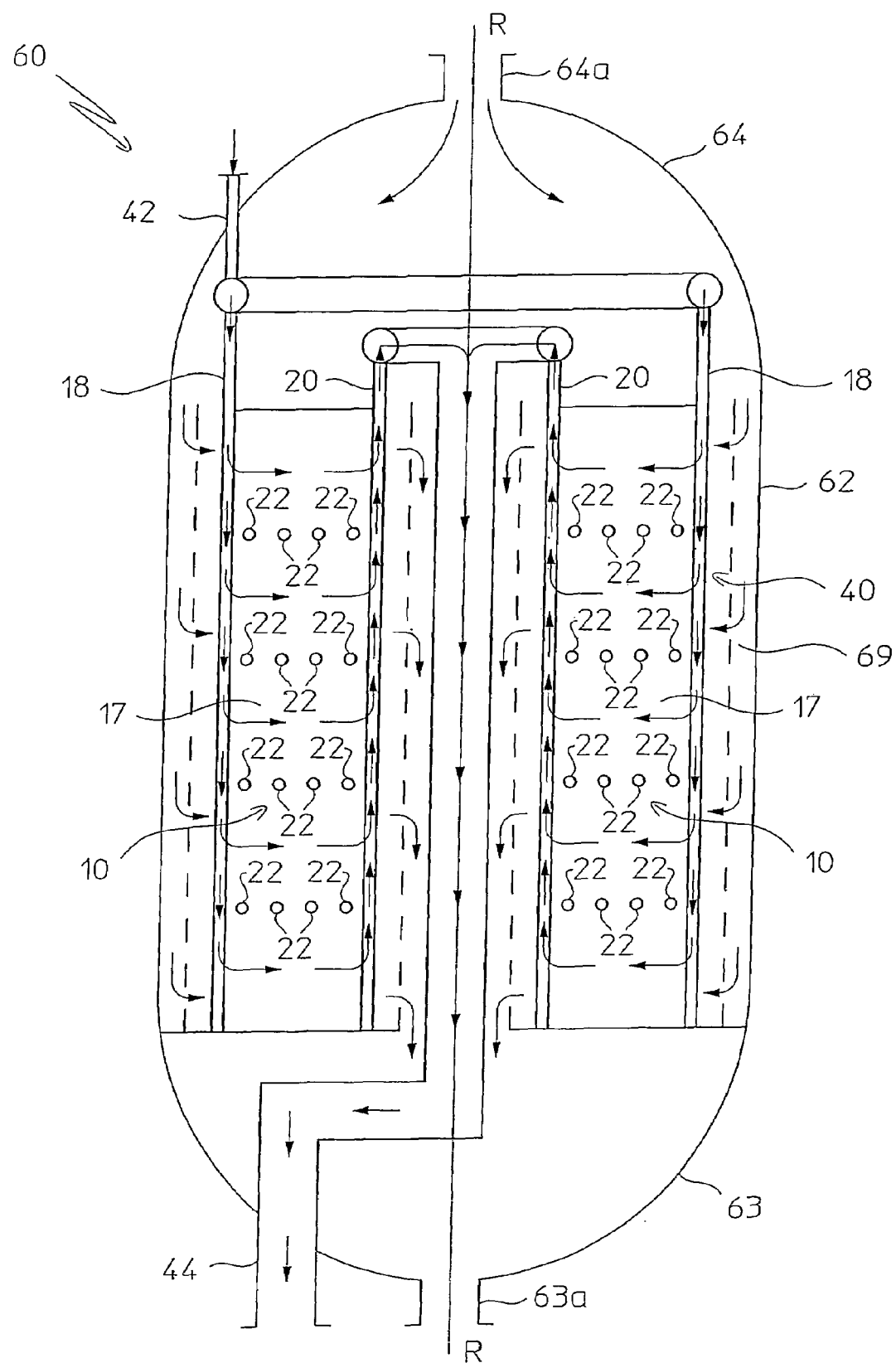
FIG. 1 shows a schematic longitudinal section view of a chemical reactor wherein a plurality of plate type heat exchangers is installed, produced according to the method of the present invention.

With reference firstly to the FIGS. 1, 2, 3, 4a, 4b and 4c, a chemical reactor is shown, globally identified by the numeral 60, comprising a heat exchange unit 40, in turn comprising a plurality of plate type heat exchangers 10, produced using the method of the present invention.

More precisely, the chemical reactor 60 comprises a cylindrical shell 62 having an axis R-R, closed at opposite ends by respective bottoms, lower 63 and top 64. Inside the shell 62 it is provided a reaction environment 69 comprising a per se known catalytic bed that is crossed by a reactant fluid.

The heat exchange unit 40 is supported, in a per se conventional manner, in the reaction environment 69, and, more precisely, inside the catalytic bed, the heat exchange unit 40 being intended to be dipped in a mass of a appropriate catalyst, not shown in the drawing.

The reactant fluid enters the chemical reactor 60 through a nozzle 64a of the top bottom 64, and reaches the catalytic bed. The reaction products leave the reactor through a opening 63a of the lower bottom 63. Each plate type heat exchanger 10 is fed with a heat exchange operative fluid, which enters the reactor 60 through an inlet opening 42 and exits therefrom through an outlet opening 44. The heat exchangers 10 of the heat exchange unit 40 are in mutual fluid communication and are connected to the inlet opening 42 and outlet opening 44 in an absolutely conventional manner.

The plate type heat exchanger 10 is produced starting from two metal plates 12 and 14, for example rectangular in shape, preferably having the same dimensions.

Figure 4A:
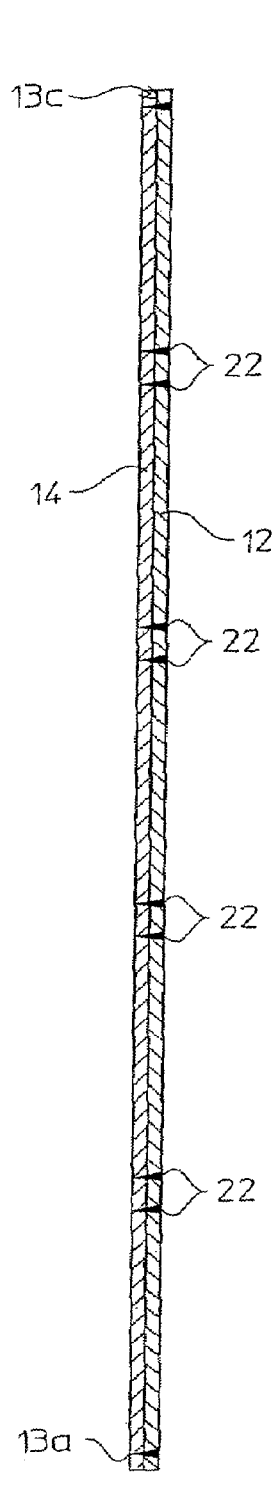
FIGS. 4a, 4b and 4c show a schematic section views of subsequent operative steps of production of the heat exchanger shown in detail in FIG. 3, taken as well along the plane z in FIG. 2.

Said plates 12 and 14 are juxtaposed and are welded together at respective perimetric sides 13a, 13b, 13c, 13d, and at a plurality of welding tracts 22, arranged in alignments (in said figures four alignments have been shown: generally speaking, these alignments are at least two in number), parallel and adjacent to a couple of opposite perimetric sides (13a and 13c in the illustrated example) of the plates 12 and 14 themselves, and in pre-established spaced relationship from them. Generally, the distance between two alignments of welding tracts 22 is constant and is equal to the distance between the perimetric sides 13a and 13c and the respective adjacent welding tracts 22 (FIG. 4a).

Figure 2:
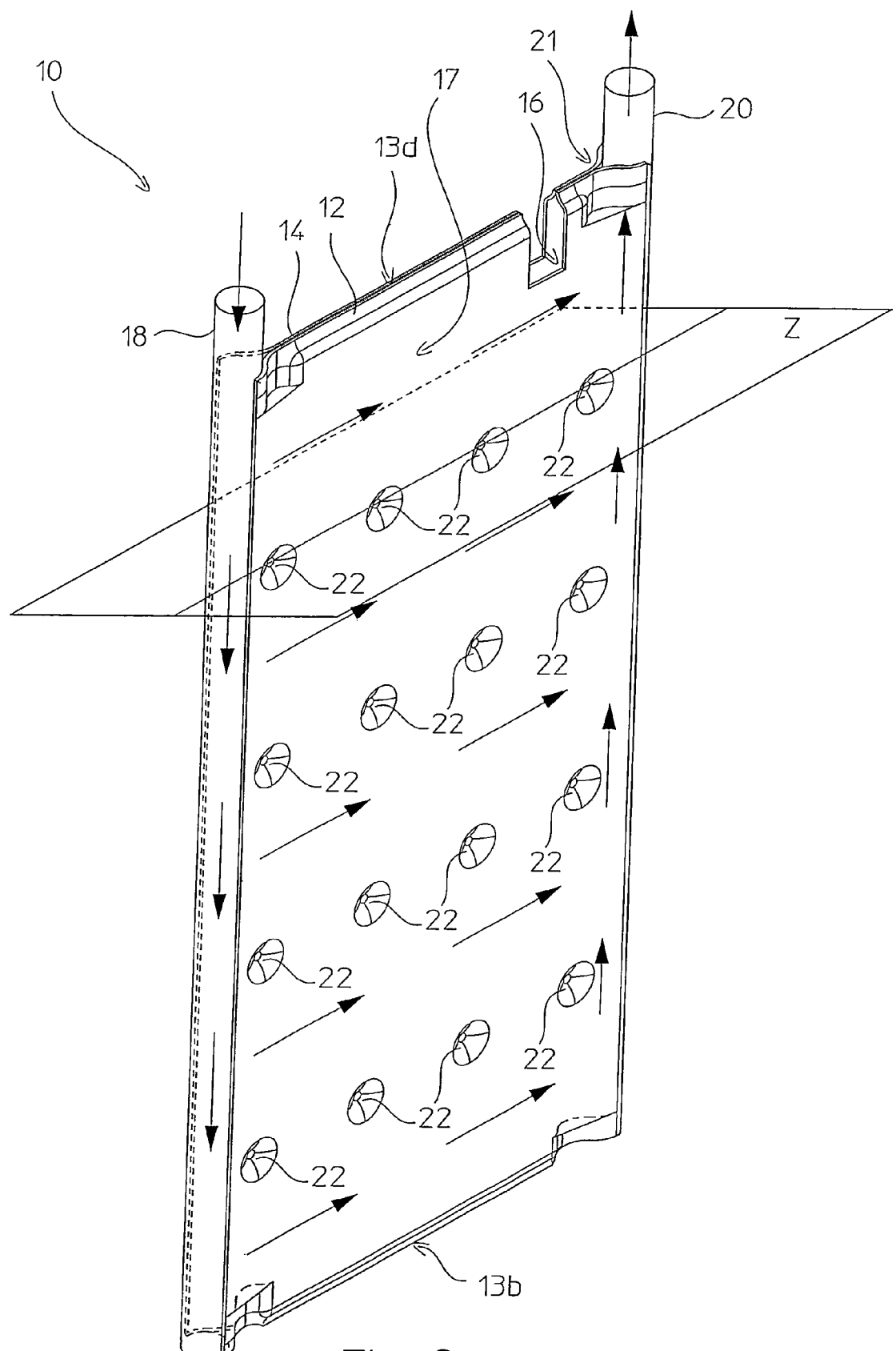
FIG. 2 shows a perspective view of a plate type heat exchanger, produced according to the method of the present invention, included in the reactor in FIG. 1.

In the non-limiting example shown in FIG. 2, the welding tracts 22 have a limited length, and in practice are welding "spots" (where the welding area is punctiform).

Figure 4B:
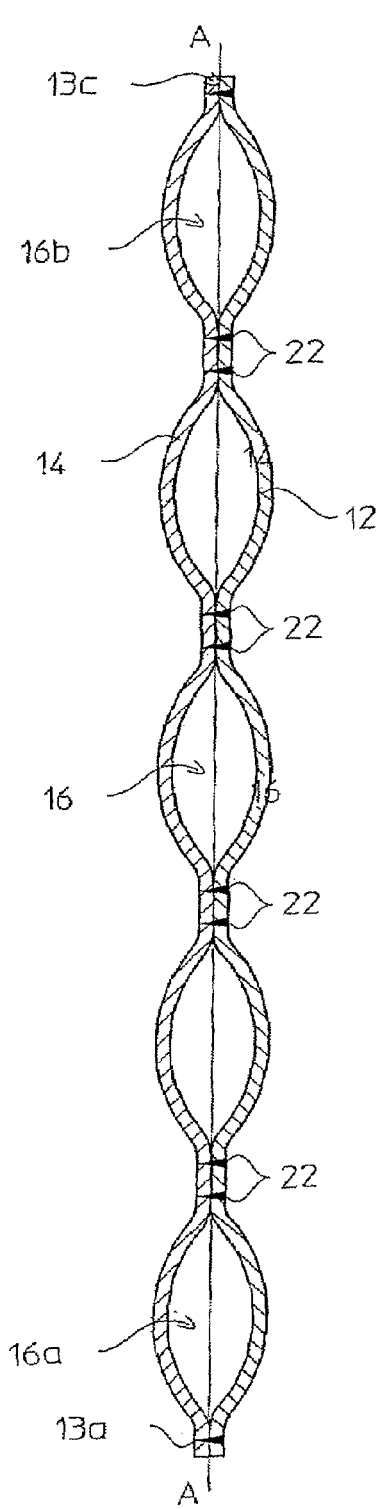

At this point the so-called pumping step is performed, in other words, a fluid under pressure is introduced between said metal plates 12 and 14 that are juxtaposed to form a hollow body 17, substantially box-shaped, preferably flattened, for example with a parallelepiped form, wherein it is defined an internal chamber 16 and two substantially tubular passages 16a and 16b, formed between said couple of opposite perimetric sides 13a and 13c and the respective adjacent alignments of the welding tracts 22, said substantially tubular passages having an axis parallel to said opposite perimetric sides 13a and 13c, and being in fluid communication with said internal chamber 16 (FIG. 4b).

Figure 4C:
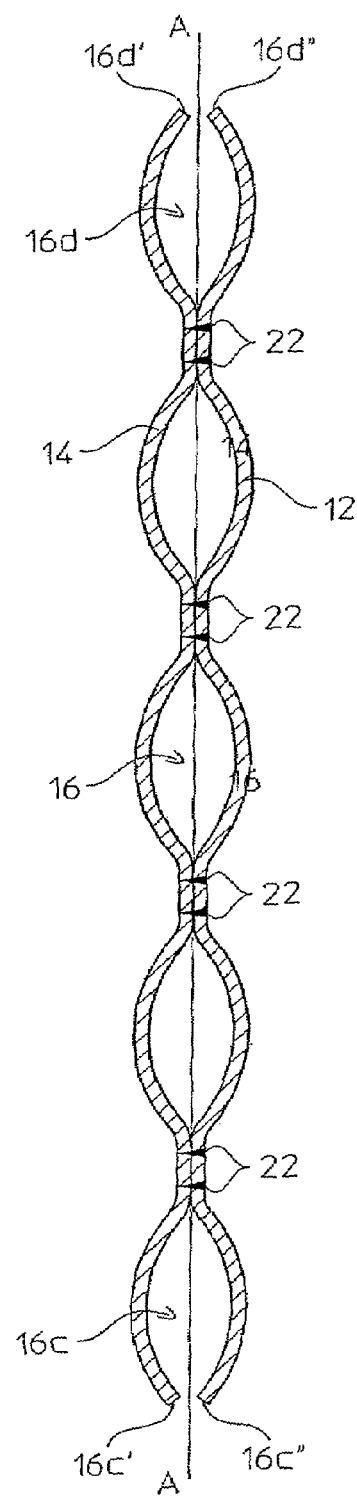

According to the present invention, the method comprises the operative steps of cutting said hollow body 17 along said substantially tubular passages 16a and 16b and in the direction of their axis, thus obtaining, on the opposite sides of said hollow body, substantially semi-tubular passages 16c and 16d, open towards the outside of the body in question (FIG. 4c).

At this point, the two cut perimetric sides 13a and 13c are removed.

According to the invention, respective distributor 18 and collector ducts 20 are associated with said substantially semi-tubular passages 16c and 16d, destined to distribute and respectively collect a heat exchanger operative fluid into and from said internal chamber 16. Generally, the distributor 18 and collector 20 ducts are cylindrical.

The internal chamber 16 is in fluid communication with the exterior of the heat exchanger through an inlet opening and an outlet opening for said operative fluid. More precisely, the inlet opening is in fluid communication with the distributor duct 18, while the outlet opening is in fluid communication with the collector duct 20.

According to an embodiment of the method of the invention (as can be seen in the examples shown in the attached figures), the distributor duct 18 and the collector duct 20 are welded on the substantially semi-tubular passages 16c and 16d, close to respective end tracts 16c' and 16c" and 16d' and 16d" thereof respectively, which have been appropriately opened wide apart to house said distributor duct 18 and collector duct 20.

Advantageously, said operative step is performed by an automated welding device which performs autogenous welding, preferably by means of laser beams.

Said device performs two weldings 24 and 26 on the distributor duct 18 and two weldings 25 and 27 on the collector duct 20, said weldings being continuous and in a longitudinal direction, substantially symmetrical with each other in relation to the symmetric plane A-A of the heat exchanger 10 to be realized. In particular, the weldings 24 and 26, and respectively, the weldings 25 and 27 are performed along generants of the distributor duct 18 and the collector duct 20 which are substantially symmetrical with each other in relation to the symmetric plane A-A of the heat exchanger 10 to be realized. The two weldings 24 and 26, and respectively 25 and 27 define two portions of duct, where the duct portion, which faces the internal chamber 16 where the heat exchange operative fluid flows, presents suitable openings 28 (for example holes) to put the heat exchange operative fluid in fluid communication with the internal chamber 16.

Figure 3:
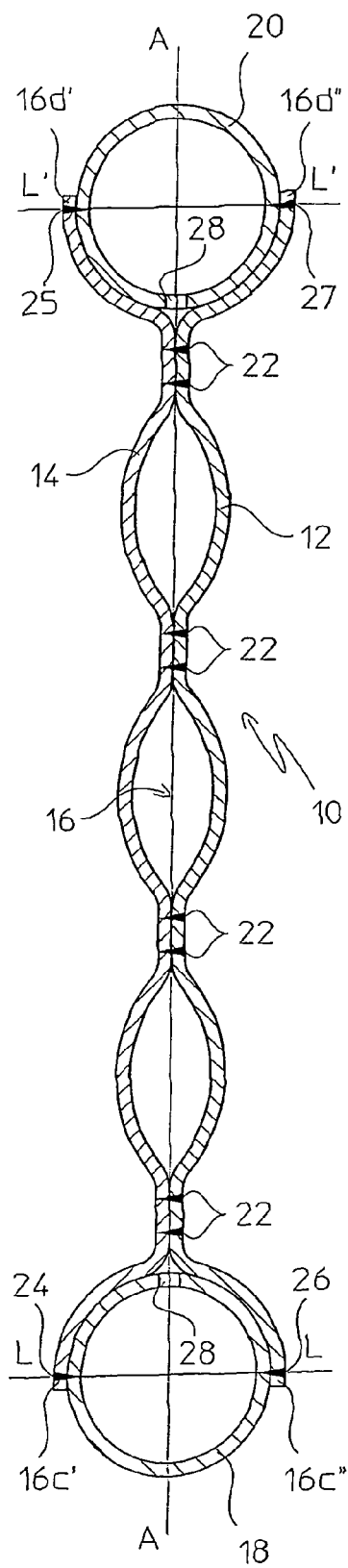
FIG. 3 shows a schematic transversal section view of the plate type heat exchanger shown in FIG. 2, taken along plane z in FIG. 2.

In the example shown in FIG. 3, the two couples of weldings 24 and 26, and respectively the weldings 25 and 27 are diametrically opposite and are parallel to the plates 12 and 14. More precisely, the weldings 24 and 26, and respectively 25 and 27, lay on plane L-L and L'-L' respectively, substantially perpendicular to the plane of symmetry A-A of the heat exchanger 10 to be realized.

Figure 5:
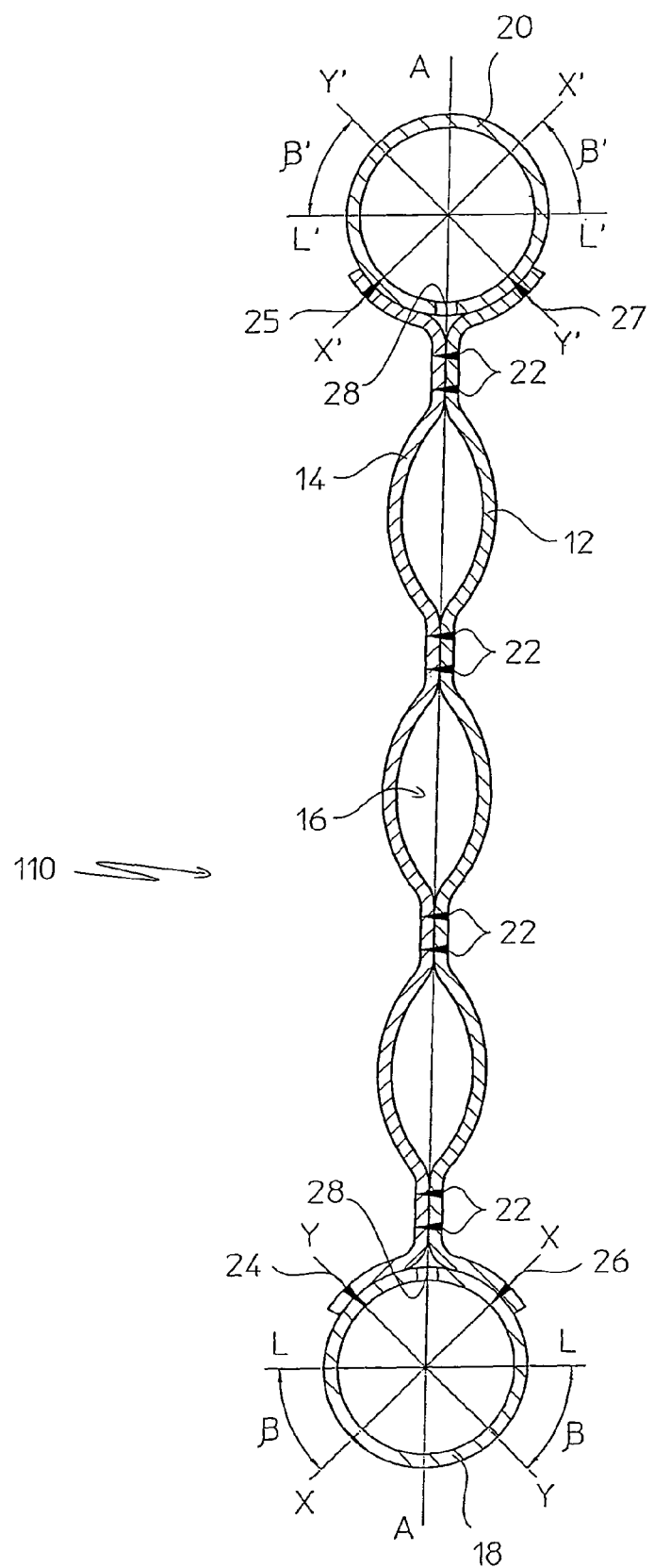
FIG. 5 shows a schematic transversal section view of a second embodiment of a plate type heat exchanger produced according to the method of the present invention.

FIG. 5 shows a second embodiment of a plate type heat exchanger, produced according to the method of the invention, said exchanger being identified with the numeral 110.

In this figure, the structural elements that are identical or operatively equivalent to those described in the heat exchanger 10 shown in FIG. 2 described above, will be identified with the same numerals, and will not be described any further. The heat exchanger 110 differs from the heat exchanger 10 in that the weldings 24 and 26, and respectively 25 and 27, parallel to the plates 12 and 14, lay on plane X-X and Y-Y, and X'-X' and Y'-Y' respectively, incident to the axis of the distributor duct 18 and the collector duct 20 and forming respective acute angles that are substantially equal ($\beta$, $\beta'$) in relation to the plane L-L and L'-L', to which the axis of the distributor duct 18 and the collector duct 20 belongs. More precisely, the two weldings 24 and 26 (similar considerations also apply to the couple of weldings 25 and 27) are symmetrical in relation to the plane of symmetry A-A of the heat exchanger 110 to be realized, and lay on plane X-X and Y-Y which are symmetrical in relation to the plane of symmetry A-A and which are set at an acute angle $\beta$ in relation to the plane L-L, perpendicular to the plane A-A. Preferably the acute angle $\beta$, as well as angle $\beta'$, is between 0° and 50°, according to the diameter of the distributor duct 18 and the collector duct 20. In particular, the acute angles f and $\beta'$ are between 10° and 45°.

It should be noted that with this embodiment, the distance between the weldings 24 and 26, and the adjacent alignment of welding tracts 22 (as between the weldings 25 and 27 and the adjacent alignment of welding tracts 22) is reduced, advantageously providing the heat exchanger 110 with greater mechanical strength. In other words, the heat exchanger 110 is suitable for use in the majority of the fields of application, including those in which the heat exchanger is subjected to considerable mechanical stress.

Figure 6:
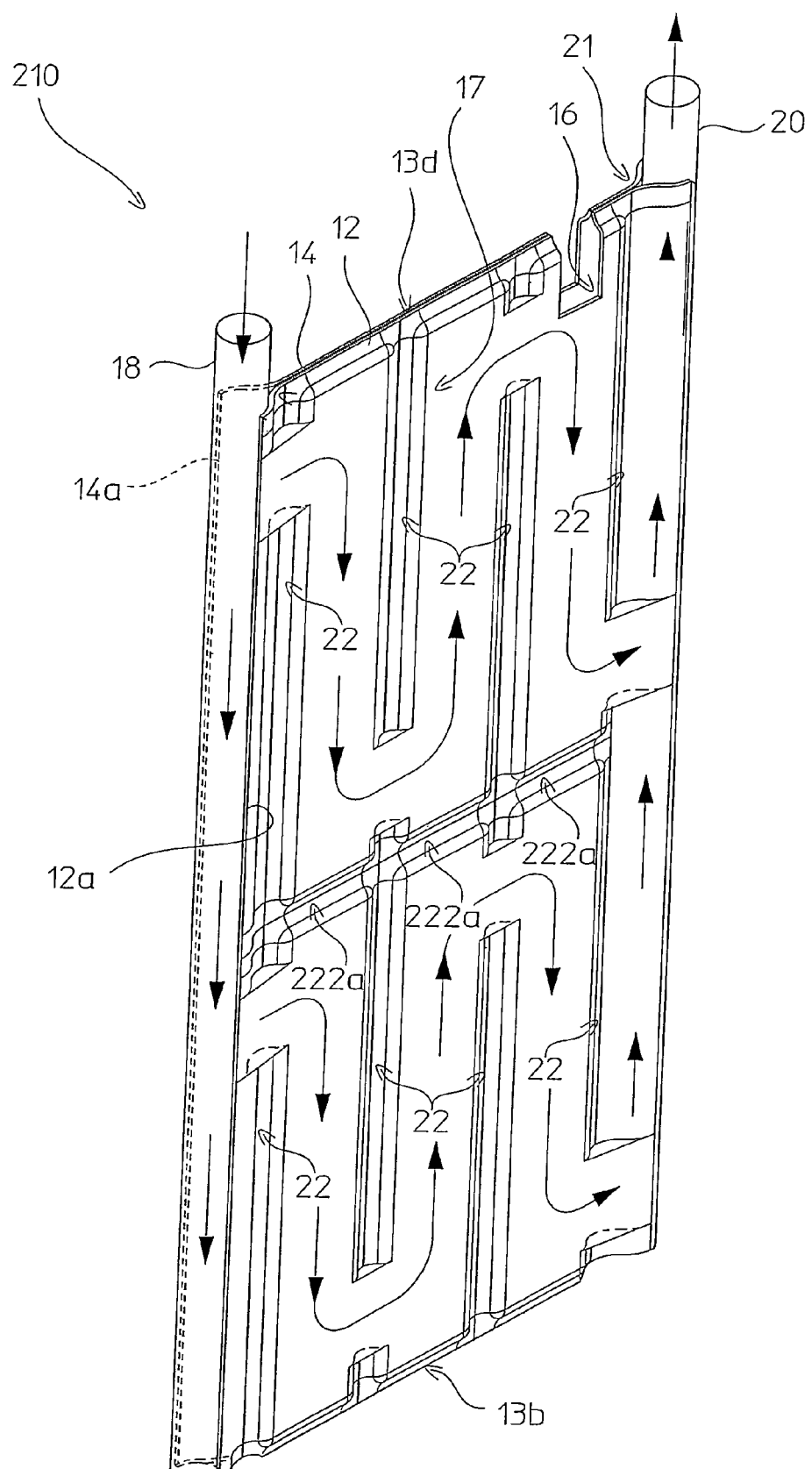
FIG. 6 shows a schematic perspective view of a third embodiment of a plate type heat exchanger produced according to the method of the present invention.

FIG. 6 shows a third embodiment of a heat exchanger produced according to the method of the invention, said exchanger being identified with the numeral 210. In this figure, the structural elements that are identical or operatively equivalent to those of the heat exchanger 10 shown in FIG. 2 described above, will be identified with the same numerals and will not be described any further.

In this embodiment, with a suitable positioning of the said welding tracts 22, and providing further welding tracts 222a parallel to the couple of opposite perimetric sides 13b and 13d, pre-established paths to cross the internal chamber 16, with serpentine form, are defined.

From the previous description it can clearly be seen that the method for the production of plate type heat exchangers according to the invention solves the technical problem and achieves numerous advantages the first of which lies in the fact that it provides an unusually high productivity rate and permit to obtain a heat exchanger that is extremely resistant to the operative fluid pressure.

In fact, advantageously, the pumping step of the fluid under pressure used to form the hollow body, is performed without the complication of the external restraining elements used in the prior art, since it is possible to choose the distance between the weldings of the perimetric sides and the adjacent alignment of the welding tracts, equal to the distance between two alignments of adjacent welding tracts (FIG. 4a): in this manner the fluid under pressure swells the "ducts" of the internal chamber and the two substantially tubular passages (FIG. 4b), in a uniform and simultaneous manner.

Furthermore, with the method of the present invention, it is possible to choose the most appropriate thickness for the distributor and collector ducts, simply dimensioning the thickness of the metal plates only according to the mechanical resistance that must be conferred to the "duct's" of the internal chamber, defined by the alignments of adjacent welding tracts.

In other words, with the method according to the invention a heat exchanger is obtained under easy production conditions and at lower cost compared to heat exchangers according to, the prior art. In particular, heat exchangers can be, realized, customized for the use in chemical reactors where there is a great difference in pressure between the exterior and the interior of the heat exchanger itself.

Furthermore, should the plate type heat exchangers be destined to be crossed by the heat exchange operative fluid substantially in the direction of the axis of the chemical reactor in which they are positioned, it has been noticed that the distributor duct provides the advantageous effect of making usable for the heat exchange also an initial zone of the internal chamber (in other words, the zone that is in close to said distributor duct). In fact, in this case, the heat exchange operative fluid is distributed in a uniform and homogeneous manner along the whole side of the heat exchanger where the distributor duct is provided, already at the side in question.

Of course, a man skilled in the art can bring numerous modifications and variants to the method for the production of plate type heat exchangers described above, in order to satisfy specific and contingent requirements, all of which are covered by the scope of protection of the present invention, as defined by the following claims.

The invention claimed is:

1. A method for the production of heat exchangers of the so-called plate type, comprising the operative steps of:
    juxtaposing a couple of substantially identical metal plates;
    fixing together said juxtaposed plates to one another by means of welding performed at respective perimetric sides;
    further fixing together said juxtaposed plates to each other by means of a plurality of welding tracts, arranged in at least two alignments, parallel and adjacent to a couple of opposite perimetric sides of the plates themselves, and at a pre-established spaced relationship from said sides;
    introducing a fluid under pressure between said juxtaposed metal plates, to form a hollow, substantially box-shaped body, in which an internal chamber and two substantially tubular passages, formed between said couple of opposite perimetric sides and the respective adjacent alignments of the welding tracts, are defined, said substantially tubular passages having an axis parallel to said opposite perimetric sides and being in fluid communication with said internal chamber;
    cutting said hollow body along said substantially tubular passages and in the direction of their axis, thus obtaining a hollow body equipped, on opposite sides, with substantially semi-tubular passages, open towards the outside of the body itself; and
    associating with said substantially semi-tubular passages, respective distributor duct and collector duct, destined to distribute and respectively collect a heat exchange operative fluid into and from said internal chamber.

2. Method according to claim 1, wherein the distributor duct and collector duct are associated by means of welding on the substantially semi-tubular passages, close to respective end tracts thereof.

3. Method according to claim 2, wherein the weldings of said respective end tracts are performed by means of an automated welding device which performs autogenous welding, using laser beams.

4. Method according to claim 2, wherein said weldings of said respective end tracts are continuous and longitudinal, substantially symmetrical with each other in relation to the plane of symmetry of the heat exchanger to be realized.

5. Method according to claim 4, wherein couples of said weldings are diametrically opposite and are parallel to the plates.

6. Method according to claim 4, wherein couples of said weldings, parallel to the plates, lay on planes incident to the axis of the distributor duct and collector duct respectively and which form respective substantially equal acute angles with respect to planes to which the axis of the distributor duct and of the collector duct respectively belongs, substantially perpendicular to the plane of symmetry of the heat exchanger to be realized.

7. Method according to claim 6, wherein said acute angles are between 0° and 50°.

8. A plate-type heat exchanger, comprising:
    a hollow, substantially box-shaped, parallelepiped body, in which is defined an internal chamber destined to be crossed by a heat exchange operative fluid, the body comprising a couple of substantially identical metal plates juxtaposed and fixed together by means of welding performed at respective perimetric sides, and including a plurality of welding tracts, arranged in at least two alignments, parallel and adjacent to a couple of opposite perimetric sides of the plates themselves, and at a pre-established spaced relationship from said sides, the body defining two substantially semi-tubular passages formed by cutting said hollow body along two substantially tubular passages formed between said couple of opposite perimetric sides and the respective adjacent alignments of welding tracts, the substantially tubular passages having an axis parallel to said opposite perimetric sides and being in fluid communication with said internal chamber, wherein the substantially semi-tubular passages are open towards the outside of the body; and
    a distributor duct and a collector duct destined to distribute and respectively collect said heat exchanger operative fluid into and from said internal chamber, said ducts being associated with said substantially semi-tubular passages on opposite sides of said body, said distributor and collector duct destined to distribute and respectively collect a heat exchange operative fluid into and from said internal chamber,
    wherein said distributor duct and said collector duct are associated by means of welding on the substantially semi-tubular passages, close to respective end tracts thereof,
    wherein said weldings of said respective end tracts are continuous and longitudinal, substantially symmetrical to each other in relation to a plane of symmetry of the heat exchanger, and
    wherein couples of said weldings are parallel to the plates, and lay on planes which are incident to and form substantially equal acute angles of between 0° and 50° with respect to a plane to which the axis of the distributor duct and collector duct belongs, substantially perpendicular to the plane of symmetry of the heat exchanger.

9. Heat exchanger according to claim 8, wherein said couples of said weldings are diametrically opposite to the plates.

10. A chemical reactor of the type comprising:
    a cylindrical shell, closed at the opposite ends by respective bottoms, lower and top respectively,
    a reaction environment provided inside the shell and comprising a catalytic bed in which a heat exchange unit is positioned, comprising a plurality of plate type heat exchangers, wherein said heat exchangers are realized according to claim 8.

* * * * *